United States Patent [19]

Gleave

[11] 4,105,715

[45] Aug. 8, 1978

[54] CYANOACRYLATE ADHESIVE PASTE COMPOSITIONS

[75] Inventor: Edward Roger Gleave, Dublin, Ireland

[73] Assignee: Loctite (Ireland) Limited, Dublin, Ireland

[21] Appl. No.: 814,581

[22] Filed: Jul. 11, 1977

[30] Foreign Application Priority Data

Jul. 14, 1976 [IE] Ireland ................................ 1553/76

[51] Int. Cl.² .............................................. C08L 33/00
[52] U.S. Cl. ..................................... 260/881; 156/331; 156/334; 260/873; 260/878 R; 260/884; 526/298
[58] Field of Search ................. 526/298; 260/881, 884

[56] References Cited

U.S. PATENT DOCUMENTS

| | | | |
|---|---|---|---|
| 2,794,788 | 6/1957 | Coover et al. | 260/17 |
| 3,607,542 | 9/1971 | Leonard | 156/285 |
| 3,663,501 | 5/1972 | Adams et al. | 260/41 R |
| 3,692,752 | 9/1972 | Setsuda et al. | 260/78.5 N |
| 3,836,377 | 9/1974 | Delahunty | 106/287 |
| 4,042,442 | 8/1977 | Dombroski et al. | 156/310 |

*Primary Examiner*—Richard B. Turer
*Attorney, Agent, or Firm*—Jean B. Mauro

[57] ABSTRACT

A cyanoacrylate adhesive composition in thixotropic paste form is made by mixing a liquid cyanoacrylate ester with powdered organic fillers selected from (i) polycarbonates, (ii) polyvinylidene fluorides, (iii) polyethylenes, and (iv) acrylic block copolymer resins containing saturated elastomer segments. Concentration of the filler is about 5 to 100 parts by weight. Particle size of the filler is about 2 to 200 microns.

5 Claims, No Drawings

CYANOACRYLATE ADHESIVE PASTE COMPOSITIONS

BACKGROUND OF THE INVENTION

1. Field of the Invention

This invention relates to cyanoacrylate adhesive compositions which are improved by being rendered thixotropic and nondripping by incorporation of finely divided organic powders.

2. Description of the Prior Art

Liquid cyanoacrylate compositions have long been known in the art as excellent adhesives. Having achieved wide acceptance in industrial applications, cyanoacrylates have recently made enormous advances in sales in the consumer adhesive market. Various of the inherent characteristics of cyanoacrylates, which caused no particular difficulties in industrial automatic application equipment, have been detrimental to their unqualified acceptance in consumer use.

Chief among these characteristics are (1) the adhesives' relatively low viscosity, causing it to run or drip off the point of application to some undesired point, and (2) its extremely rapid cure speed when catalyzed by small amounts of moisture, as found in human skin. These characteristics have often made cyanoacrylates troublesome and inconvenient to use by unskilled consumers. Accordingly, a cyanoacrylate adhesive composition with controlled flow characteristics and easier applicability, while yet retaining desirably rapid cure speed and bond strength, would be a great boon to the consumer market, as well as to industrial applications where such properties would be advantageous.

A variety of fillers has been incorporated into cyanoacrylate adhesive compositions to bring about certain changes in properties. U.S. Pat. No. 2,794,788 teaches thickening of cyanoacrylate adhesives by dissolving therein quantities of polymeric alkyl cyanoacrylates, as well as other compounds including polyacrylates and methacrylates, and cellulose esters such as acetate, propionate and butyrate.

U.S. Pat. No. 3,836,377 notes among the additional known thickeners polyvinyl ethers such as polyvinylmethyl ether. U.S. Pat. No. 3,692,752 discloses thickened cyanoacrylate solutions containing certain polyether acrylates/methacrylates, acrylic/methacrylic esters of bis(hydroxyalkyl) phosphonic acid derivatives, and acrylic/methacrylic esters of tris(hydroxyalkyl) cyanuric acid derivatives.

The preceding references relate to thickened homogeneous solutions containing organic compounds as thickeners. Various inorganic materials have also been proposed as fillers, which also have the effect of thickening the composition. Thus, U.S. Pat. No. 3,663,501 teaches preparation of a dental cement containing inert, finely-divided solids such as fused silica, quartz and alumina. Similarly, U.S. Pat. No. 3,607,542 teaches the preparation of a water-resistant cyanoacrylate paste containing insoluble, inert fillers such as salts of calcium, titanium, zinc, tin, aluminum, iron and cooper, among others.

None of the known references relates to use of certain finely-divided organic powders which are not dissolved or not fully dissolved in the cyanoacrylate monomer and which convert the liquid cyanoacrylate to a nondrip, thixotropic gel or paste.

SUMMARY OF THE INVENTION

According to the invention, there is provided a thixotropic, curable adhesive composition comprising:
(a) a monomeric ester of 2-cyanoacrylic acid,
(b) to each 100 parts by weight of monomeric ester, about 5 to about 100 parts by weight of a finely divided organic powder selected from the group consisting of:
(i) polycarbonates
(ii) polyvinylidene fluorides
(iii) polyethylenes
(iv) acrylic block copolymer resins containing saturated elastomer segments.

The composition also preferably contains one or more known acidic and free radical inhibitors, and optionally other functional additives for such purposes as improving thermal resistance, providing color, accelerating the cure reaction, providing crosslinking, etc.

By adjusting the quantity and kind of filler, the compositions of this invention may be prepared in various forms, from a loose jelly to a thick paste. In all forms, however, they have thixotropic properties.

It is a surprising and important advantage of these compositions that they retain most of the bond strength of the unfilled cyanoacrylate adhesive even when heavily filled.

DETAILED DESCRIPTION OF THE INVENTION

The benefits of this invention are achievable with essentially all adhesive compositions based upon cyanoacrylate esters. Most commonly, the esters have the formula

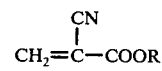

wherein R represents a $C_{1-16}$ alkyl, cycloalkyl, alkenyl, cycloalkenyl, phenyl or heterocyclic (such as furfuryl) radical. Naturally, the above R group can contain any linkages or substituents which do not adversely affect the monomer in the performance of its intended function in the cyanoacrylate adhasive compositions, such as strongly basic substituents which may adversely affect the stability of the adhesive composition. For purposes of this invention, the preferred monomers are those wherein R is a cyclohexyl or a $C_1$ to $C_6$ alkyl, or alkenyl radical. Most preferred are methyl and ethyl cyanoacrylates. The esters may be used singly or in admixture.

The above monomeric esters of 2-cyanoacrylic acid can be prepared by methods known in the art, such as those described in U.S. Pat. Nos. 2,467,927 to Ardis, issued Apr. 9, 1949 and 3,254,111 to Hawkins et al., issued May 31, 1966.

Cyanoacrylate esters adhesive compositions generally contain an anionic inhibitor, e.g., an acidic substance, soluble in the ester of 2-cyanoacrylic acid, which inhibits anionic polymerization. The specific inhibitor chosen is not critical to this invention, and a number of suitable inhibitors of anionic polymerization are well known in the art.

The best known are the soluble acidic gases such as sulfur dioxide, sulfur trioxide, nitric oxide, and hydrogen fluoride. More recently, organic sultone inhibitors have been developed, the sultone being generally represented by the formula

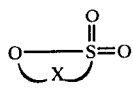

wherein X is an organic radical joining the —S(O$_2$)O— group in a 4, 5, or 6 member heterocyclic ring, preferably a 5 member heterocyclic ring. Preferably, X is a hydrocarbon group, although it can contain any substituents or linkages which do not adversely affect the sultone for its intended use as a stabilizer of the adhesive composition. Another excellent class of stabilizers are the organic sulfonic acids, preferably having a molecular weight less than about 400. To be optimally useful as a stabilizer in the adhesive compositions, the sulfonic acid should have a pKA value (dissociation constant in water) of less than about 2.8, and preferably less than about 1.5.

While not essential, the cyanoacrylate adhesive compositions of this invention generally also contain an inhibitor of free radical polymerization. The most desirable of these inhibitors are of the phenolic type, such as quinone, hydroquinone, t-butyl catechol, p-methoxyphenol, etc.

The above inhibitors may be used within wide ranges; but the following general guidelines are representative of common practice, all figures being weight percent of the adhesive composition: acidic gases—from about 0.001 to about 0.06% by weight; sultones—from about 0.1% to about 10% by weight; sulfonic acids —from about 0.0005% to about 0.1% by weight; free radical inhibitors—from about 0.001% to about 1%.

Other common additives for cyanoacrylate adhesive compositions are plasticizers. Plasticizers serve to make the cured bonds less brittle and, therefore, more durable. The most common of these plasticizers are C$_1$ to C$_{10}$ alkyl esters of dibasic acids such as sebasic acid and malonic acid. Other plasticizers, such as diaryl ethers and polyurethanes, also may be used, and a variety of other plasticizers are also known.

In addition to the monomer, the second required ingredient is a filler selected from:
 (a) Polycarbonates, i.e., polyesters of carbonic acid
 (b) Polyvinylidene fluoride (various grades)
 (c) Polyethylene, and
 (d) Acrylic block copolymer resins containing saturated acrylic elastomer segments.

Preferred fillers of the type (d) include acrylic block copolymers made by polymerizing a mixture of methacrylate monomers in the presence of a latex of acrylate ester polymer (the ratios of the various components being chosen so as to maximize the impact strength of mixtures of the copolymers with polyvinyl chloride, and simultaneously to minimize the incidence of swelling of extrudate during extrusion of these mixtures. These procedures are well known in the art). Mixtures of these fillers can also be used. Corresponding useful concentrations of these materials are, respectively per 100 parts by weight of monomer,
 (a) about 5 to 15 parts by weight, preferably about 8 to 12 parts;
 (b) about 35 to 100 parts by weight, preferably about 60 to 80 parts;
 (c) about 60 to 100 parts by weight, preferably about 70 to 80 parts; and
 (d) about 10 to 20 parts by weight, preferably about 12 to 15 parts.

The filler may be added gradually to the monomer with good agitation so as to form a smooth, homogeneous fluid. Preferably, high-shear mixing will be used. Preparation of a homogeneous mixture can also be achieved by dissolving or suspending the organic filler in a volatile solvent compatible with the cyanoacrylate, stirring the solvent thoroughly into the cyanoacrylate and thereafter evaporating the solvent.

The composition thus formed also will preferably be formulated to contain one or more inhibitors and stabilizers well known to the art, as previously described.

Particle size of the organic powders used as fillers in this invention will be found to vary according to commercial source, type of polymerization used in manufacture, etc. For purposes of this invention, useful particle size ordinarily occurs in the range of about 2 microns to about 200 microns, preferably from about 5 to about 50 microns. Selection of appropriate particle size (or commercial grade, as the case may be) will be a matter of routine experimentation.

The invention is illustrated, but not limited, by the following examples.

EXAMPLES

EXAMPLE 1

A cyanoacrylate paste composition was prepared by mixing the following materials:
 ethyl cyanoacrylate — 100 parts by weight, containing 40 parts per million hydroxypropane sulfonic acid as inhibitor
 polyvinylidene fluoride powder — 65 parts by weight, approximately 5 microns particle size, trade named Kynar 301 and supplied by Pennwalt (U.K.) Limited.

The resulting product was a smooth, white paste which was thixotropic and non-drip and could be easily spread. Adhesive bonds formed with this product cured rapidly and were only slightly less strong than similar bonds made with the corresponding unfilled (control) cyanoacrylate.

EXAMPLE 2

Example 1 was repeated except that methyl cyanoacrylate was used. Equivalent results were obtained.

EXAMPLE 3

Example 1 was repeated except that the polyvinylidene fluoride was replaced by an equivalent amount of either polycarbonate or polyethylene. Except for the color, equivalent results were obtained in both cases.

As already mentioned, the compositions of this invention have non-Newtonian viscosity characteristics, as shown by the following observations:
 (1) The compositions do not flow under their own weight, but can be made to flow easily by the application of a slightly larger force. This indicates either Bingham plastic or pseudoplastic behavior, viz., a form of fluid behavior in which a certain threshold stress must be applied to a fluid before flow occurs.
 (2) When stirred for a short time, the composition changes its consistency so that it does not flow under its own weight. On standing, the composition reverts to its original consistency and no longer flows under its own weight. This indicates thixotropic behavior in its true sense, i.e., a change of apparent viscosity with time when a fluid is stirred.

While the invention should not be construed as limited by the terms of any theoretical explanation, it would seem that the interaction between the cyanoacrylate monomer and the filler substance is responsible for producing the thixotropic consistency which is the prime feature of this invention. The filler substances incorporated, all of which are organic polymers, have low solubility in cyanoacrylate monomers. However, a certain amount of cyanoacrylate monomer is absorbed into the particles of the polymers and causes them to swell and soften. The polymers are prevented from completely dissolving either (i) by virtue of being crystalline polymers which are below their crystalline melting temperature, and therefore "frozen" out of solution (as are polycarbonate and polyvinylidene fluoride); (ii) by being of a sufficiently insoluble nature to preclude any possibility of solution (polythene); or (iii) by being composed of molecules containing segments which are soluble, attached to segments which are not (acrylic block copolymers).

These characteristics of the filler substance give rise to a liquid structure comprising swollen polymer particles of a somewhat jellyish consistency, in tight contact with each other, and surrounded by a thin liquid which fills the interstices between the particles. This obviously leads to flow behavior substantially different from that of a continuous liquid.

What is claimed is:

1. A thixotropic, curable adhesive composition comprising:
    (a) a monomeric ester of 2-cyanoacrylic acid,
    (b) for each 100 parts by weight of monomeric ester, about 5 to about 100 parts by weight of a polyvinylidene fluoride powder.

2. A composition of claim 1 containing in addition a stabilizing amount of an acidic stabilizer and a free radical inhibitor.

3. A composition of claim 1 wherein the monomeric ester is methyl cyanoacrylate or ethyl cyanoacrylate.

4. A composition of claim 1 wherein the concentration of the organic powder is about 60 to about 80 parts by weight.

5. A composition of claim 1 wherein the particle size of the organic powder is about 5 to about 50 microns.

* * * * *